United States Patent Office 3,099,692
Patented July 30, 1963

3,099,692
RECOVERY OF GLYCOLS
Edmund Cecil Owen, Harrogate, England, assignor to Imperial Chemical Industries Limited, London, England, a corporation of Great Britain
No Drawing. Filed Apr. 11, 1960, Ser. No. 22,079
Claims priority, application Great Britain May 12, 1959
1 Claim. (Cl. 260—637)

This invention relates to the purification of glycols, more particularly to the purification of ethylene glycol recovered from waste polyethylene terephthalate.

In the manufacture of fibre and film forming polyesters, for example polyethylene terephthalate, large amounts of scrap polymer, often in the form of shaped articles, are obtained and this scrap is commonly subject to an alcoholysis treatment, such as according to the processes described in British specifications 762,690 and 784,248. During this alcoholysis the polyester is converted to a dialkyl terephthalate whih is separated off from the mother liquor remaining. The glycol present is normally recovered by evaporating off the alcohol and distilling the glycol from the residual organic esters, commonly under reduced pressure. Under these circumstances if dimethyl terephthalate is present it may co-distil with the glycol in the early stages causing blockage in the still head and condenser. This inconvenience can be eliminated by heating the glycol/alkyl terephthalate mixture at 190° C. for 5 minutes at atmospheric pressure before distillation when the methanolysis catalyst remaining in the mixture is sufficient to catalyse ester interchange with formation of involatile hydroxyethyl esters.

When the waste polyester is in the form of fibre, it usually carries a dressing of spin finish which often contains hydrocarbon oils. It is found that on distillation of the glycol, the hydrocarbon oil co-distils giving a distillate consisting of an upper layer of oil easily separable by decantation and a lower emulsion of oil in glycol which is very difficult to separate.

We have now found a method whereby the hydrocarbon oil may be conveniently separated from the glycol. The process described is exemplified by the removal of hydrocarbon oil from ethylene glycol which had been obtained from the mother liquor resulting from the methanolysis of polyethylene terephthalate in the form of fibre dressed with a spin finish containing a hydrocarbon oil. The process of our invention is, however, not only applicable to the recovery of a glycol resulting from the alcoholysis of a highly polymeric polymethylene terephthalate but also to the purification of a glycol contaminated with a hydrocarbon oil irrespective of the source of the glycol.

According to our present invention we provide a process for the removal of finely dispersed hydrocarbon oil from a glycol wherein the crude glycol is filtered through a bed of fibre. By fibre we mean filamentary material of denier not greater than ten. When non-circular filaments are used a greater surface area is obtained than with circular filaments of the same denier.

We have found the process particularly suitable for the recovery of ethylene glycol from polyethylene terephthalate in fibre form dressed with spin finish containing a hydrocarbon oil, but the process is also applicable to the recovery of other glycols such as 1:4 dihydroxymethylcyclohexane from poly-hexahydropara-xylylene terephthalate.

We have not found that the effect is specific to any particular fibre, but the efficiency varies with the nature of the fibre and the form of the fibre used, for example the efficiency of a particular fibre depends on the denier, the shape of the cross section and the packing density. We have found cotton wool, wool, polyethylene terephthalate, polypropylene and viscose fibres to be efficient in the process of our invention.

When exhausted, fibre used in the filter bed may be regenerated without disturbing the bed, by passing through the bed a substance capable of dissolving the hydrocarbon oil retained in the filter bed; for this we have found methanol to be a suitable substance. For ethylene glycol it is advantageous to use a filter bed composed of polyethylene terephthalate fibre, for then the exhausted bed may be used as part of a charge for the recovery of glycol from waste polyethylene terephthalate, thus recovering the adherent glycol and eliminating the problem of disposal of the spent fibre. The recyling of oil thus entailed is not detrimental since the major part of the oil is separated before passage through the bed of fibre.

To assist in the process of our invention the contaminated glycol may first be contacted with molten paraffin wax which has the effect of absorbing the hydrocarbon oil. Some removal of the contaminating oil may also be achieved by conventional techniques such as extraction with a suitable solvent, e.g. benzene or filtration through non-filamentary material, e.g. sand, powdered glass or carbon.

The following examples illustrate but do not limit the scope of our invention.

*Example 1*

A bed of cotton wool was formed in a glass tube of ¾ inch diameter. The bed was 3.25 inches deep and contained 2.5 gm. of cotton wool. Hydrocarbon oil contaminated ethylene glycol was passed through the bed by pouring it into the tube above the bed and maintaining a head of 11 inches. The glycol which issued from below the bed was perfectly free from hydrocarbon oil. The rate of flow of glycol through the bed was 4.6 gm. per minute. A total weight of 720 gm. of glycol was clarified before the cotton wool became exhausted and oil appeared in the issuing glycol.

The oil absorbed on the cotton wool was removed as follows: The bed was washed five times without disturbance by passing through it 14 gm. of methanol and allowing it to drain. Air was then blown through the bed until the remaining methanol evaporated.

Further oil contaminated glycol was then passed through the bed and the issuing glycol was again perfectly free from oil.

*Example 2*

A bed was made up of the same dimensions as in Example 1 but composed of 2.5 gm. of polyethylene terephthalate crimped staple of 1.5 inches in length and 2.8 denier per filament. Maintenance of an 11 inch head of oily ethylene glycol above the bed produced a flow rate of 11 gm. per minute of glycol perfectly free from oil. The quantity of oily glycol filtered before the appearance of oil in the issuing glycol was 256 gm. The absorbed oil was removed by washing with methanol as described in Example 1 and the remaining methanol, evaporated by blowing with air, was led to a regenerated bed which could again be used to remove oil from oily glycol.

*Example 3*

The process of Example 2 was repeated using crimped polyethylene terephthalate staple (2.5 gm. weight) of various deniers up to 10 denier per filament. The flow rate of crude ethylene glycol through the fibre bed varied with the filament denier, being more rapid with the coarser filaments. Oil-free products were readily obtained by one pass through the finer filaments, .e.g. using an 11 inch head and flow rate 5.5 gm. per minute through 1.5 denier filaments.

With very coarse fibres the surface area of the filaments is inadequate and the amount of fibre required to treat a given amount of glycol becomes very great.

*Example 4*

Hydrocarbon oil contaminated ethylene glycol was filtered through a bed of viscose of 6 inch staple length and 4½ denier per filament. The issuing glycol was free from oil.

*Example 5*

Polyethylene terephthalate in the form of fibre dressed with spin finish containing a hydrocarbon oil was reacted with methanol. After cooling, the derived dimethyl terephthalate was separated leaving a methanolic mother liquor containing ethylene glycol. Methanol and water were evaporated from the liquor and the ethylene glycol distilled from the remaining mixture. The distillate consisted of an upper layer of oil and a lower layer of ethylene glycol containing dispersed oil. The upper layer of oil was removed and 1,000 parts of the oily ethylene glycol layer mixed with 50 parts of paraffin wax. On raising the temperature to 120° C. the paraffin wax formed a liquid upper layer. The mixture was stirred briskly, whereupon oil was dissolved in the wax. Stirring was continued until the mixture had cooled to 20° C. The wax containing the oil solidified in the form of small spheres of about 1 to 2 mm. diameter from which clear, oil free ethylene glycol was readily separated by filtration through a bed of wool, polypropylene or polyethylene terephthalate fibre of low denier.

What I claim is:

A process for the removal of finely dispersed hydrocarbon oil from a glycol which comprises contacting the hydrocarbon oil-containing glycol with molten paraffin wax, cooling the resulting liquid mixture to a temperature of about 20° C., and thereafter filtering the cooled mixture through a bed of filamentary material of not greater than 10 denier.

References Cited in the file of this patent

UNITED STATES PATENTS

| 1,712,475 | Buc | May 7, 1929 |
| 2,555,607 | Robinson | June 5, 1951 |
| 2,758,720 | Van Dijck | Aug. 14, 1956 |
| 2,772,207 | Frankel et al. | Nov. 27, 1956 |

OTHER REFERENCES

Voyutskii et al.: Chem. Amst., vol. 49 (1955), page 12,053.